United States Patent [19]

du Chene et al.

[11] Patent Number: 5,018,091
[45] Date of Patent: May 21, 1991

[54] DISCRETE FOURIER TRANSFORM CALCULATING PROCESSOR COMPRISING A REAL-TIME TESTING DEVICE

[75] Inventors: Arnaud du Chene; Bernard Dias, both of Paris; Gérard Bergeon, Maisons Alfort, all of France

[73] Assignee: Thomson-CSF, Paris, France

[21] Appl. No.: 370,072

[22] Filed: Jun. 23, 1989

Related U.S. Application Data

[63] Continuation of Ser. No. 45,881, May 4, 1987, abandoned.

[30] Foreign Application Priority Data

May 6, 1986 [FR] France .................................. 86 6544

[51] Int. Cl.[5] .............................................. G06F 15/40
[52] U.S. Cl. ........................................................ 364/726
[58] Field of Search ................................. 364/726, 754

[56] References Cited

U.S. PATENT DOCUMENTS

| | | | |
|---|---|---|---|
| 4,408,284 | 10/1983 | Kijesky et al. | 364/726 X |
| 4,760,549 | 7/1988 | du Chene et al. | 364/726 |
| 4,787,055 | 11/1988 | Bergeon et al. | 364/726 |

FOREIGN PATENT DOCUMENTS

0171305  2/1986  European Pat. Off. .
2572820  5/1986  France .
60-7575  1/1985  Japan .................................. 364/726

OTHER PUBLICATIONS

IEEE Transactions on Computers, vol. C-24, No. 12, Dec. 1975, pp. 1202-1211, New York, U.S.; De Mori et al.: "*A Special-Purpose Computer for Digital Signal Processing*", pp. 1202-1211.
Patents Abstracts of Japan, vol. 9, No. 116 (P-357)[1839], May 21, 1985; & JP-A-60 3754 (Nippon Denki K.K.) 10-01-1985.

*Primary Examiner*—Dale M. Shaw
*Assistant Examiner*—Tan V. Mai
*Attorney, Agent, or Firm*—Oblon, Spivak, McClelland, Maier & Neustadt

[57] ABSTRACT

The invention pertains mainly to a processor for the calculation of the discrete Fourier transform, comprising a real-time testing device. The device according to the invention uses the theorem of Parseval to ascertain that the processor is working properly. The device according to the invention uses, for example, an adder and a multiplier to calculate either the discrete Fourier transform or the members of the equation. Thus, by using temporal redundancy, the complexity, area and price of the processor are reduced. The invention is applied mainly to the calculation of spectra.

2 Claims, 8 Drawing Sheets

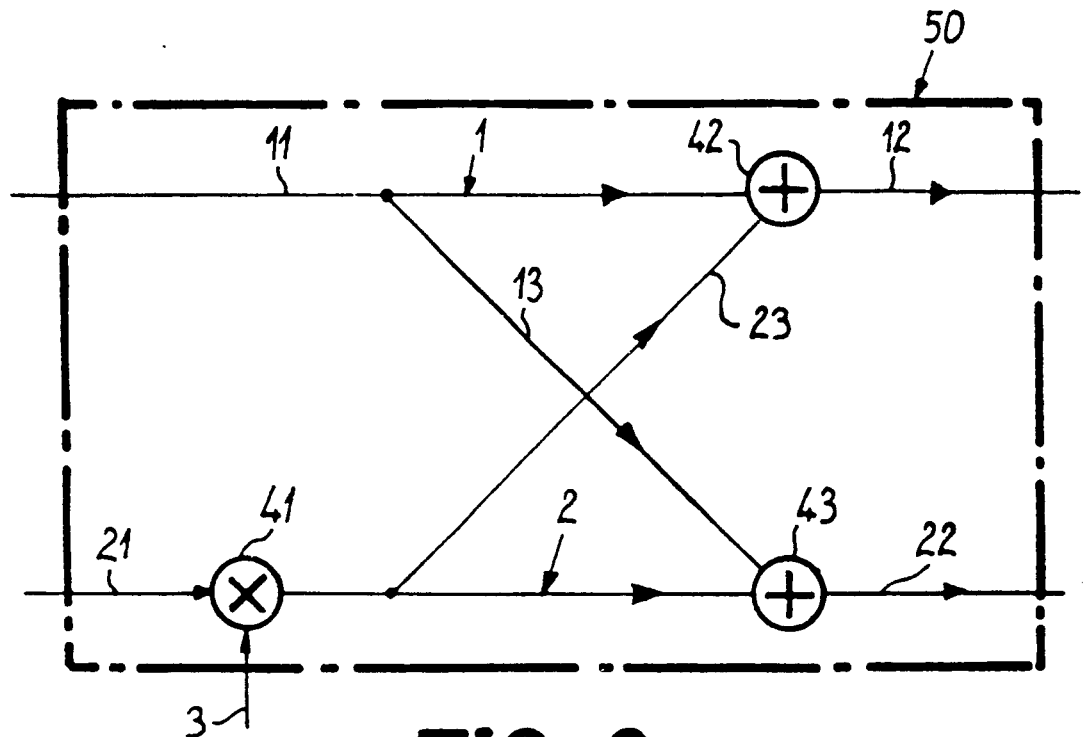
FIG_1 PRIOR ART
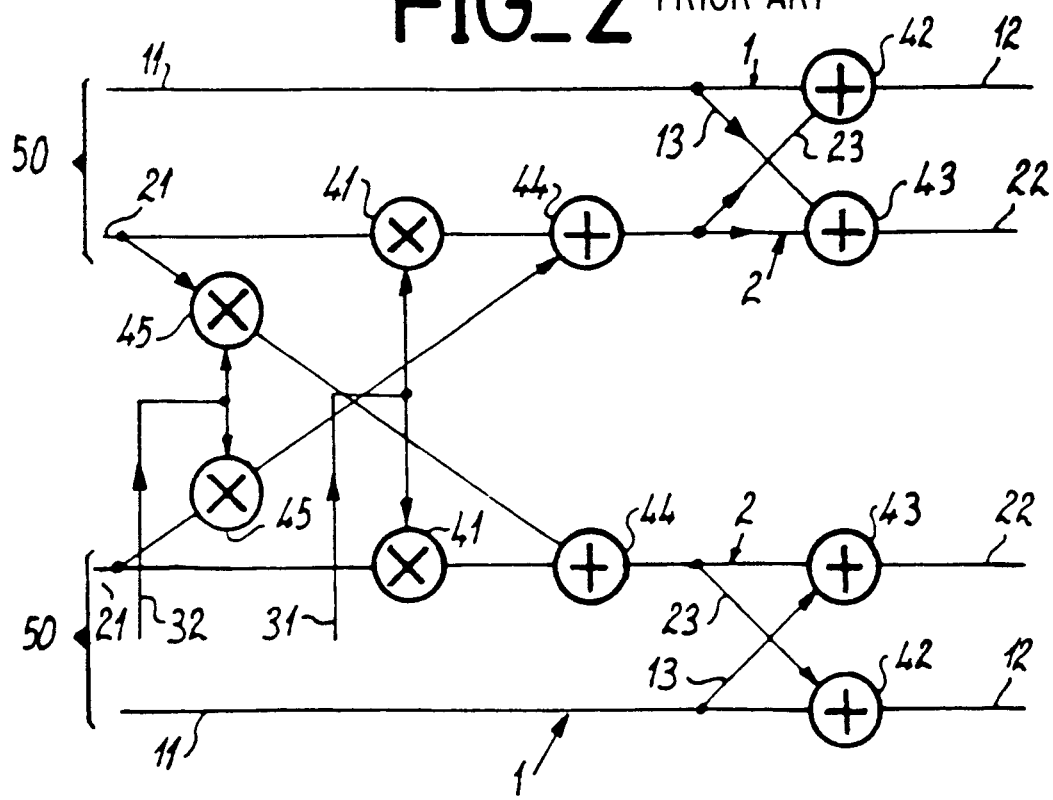
FIG_2 PRIOR ART

FIG_3
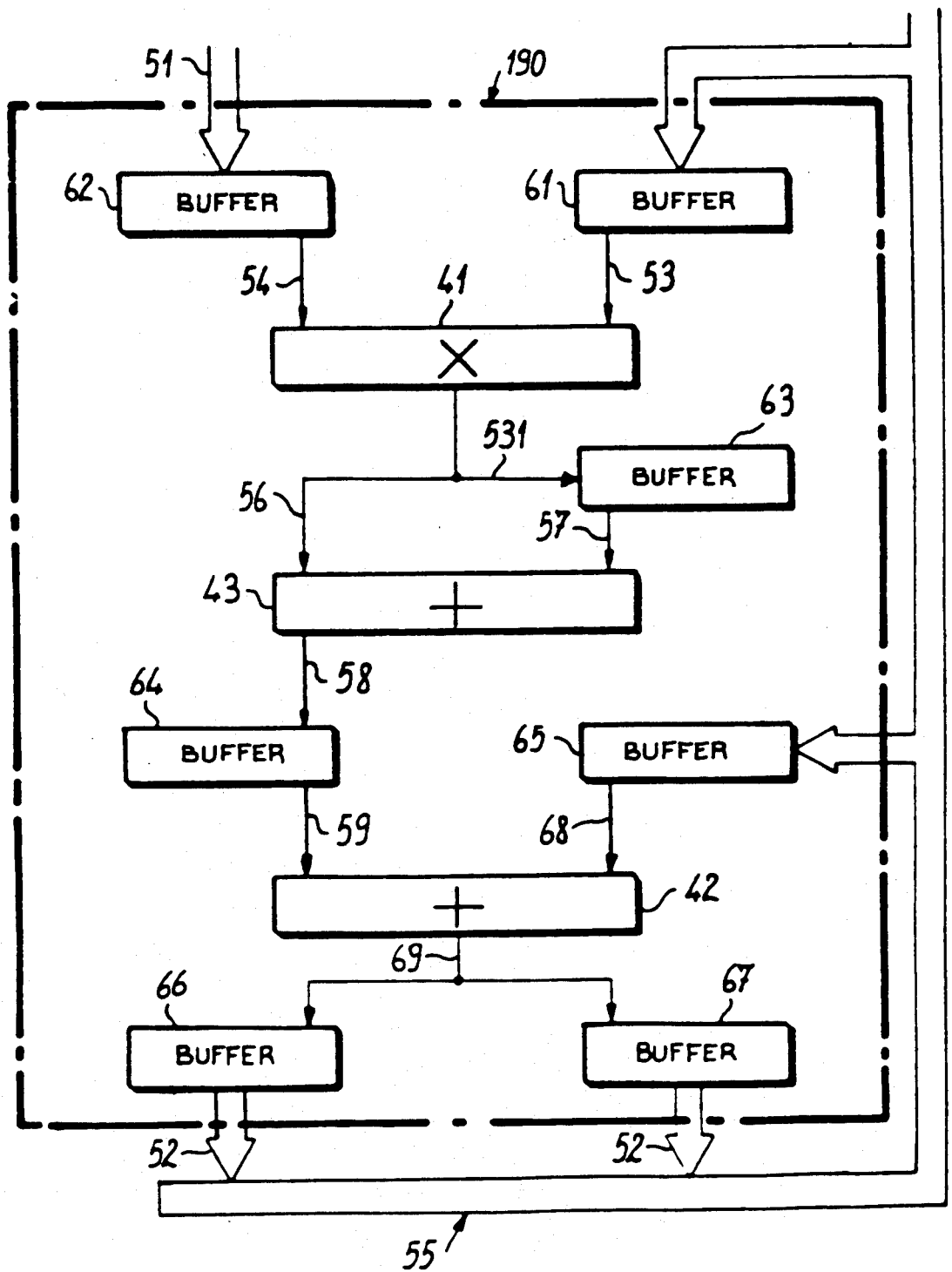

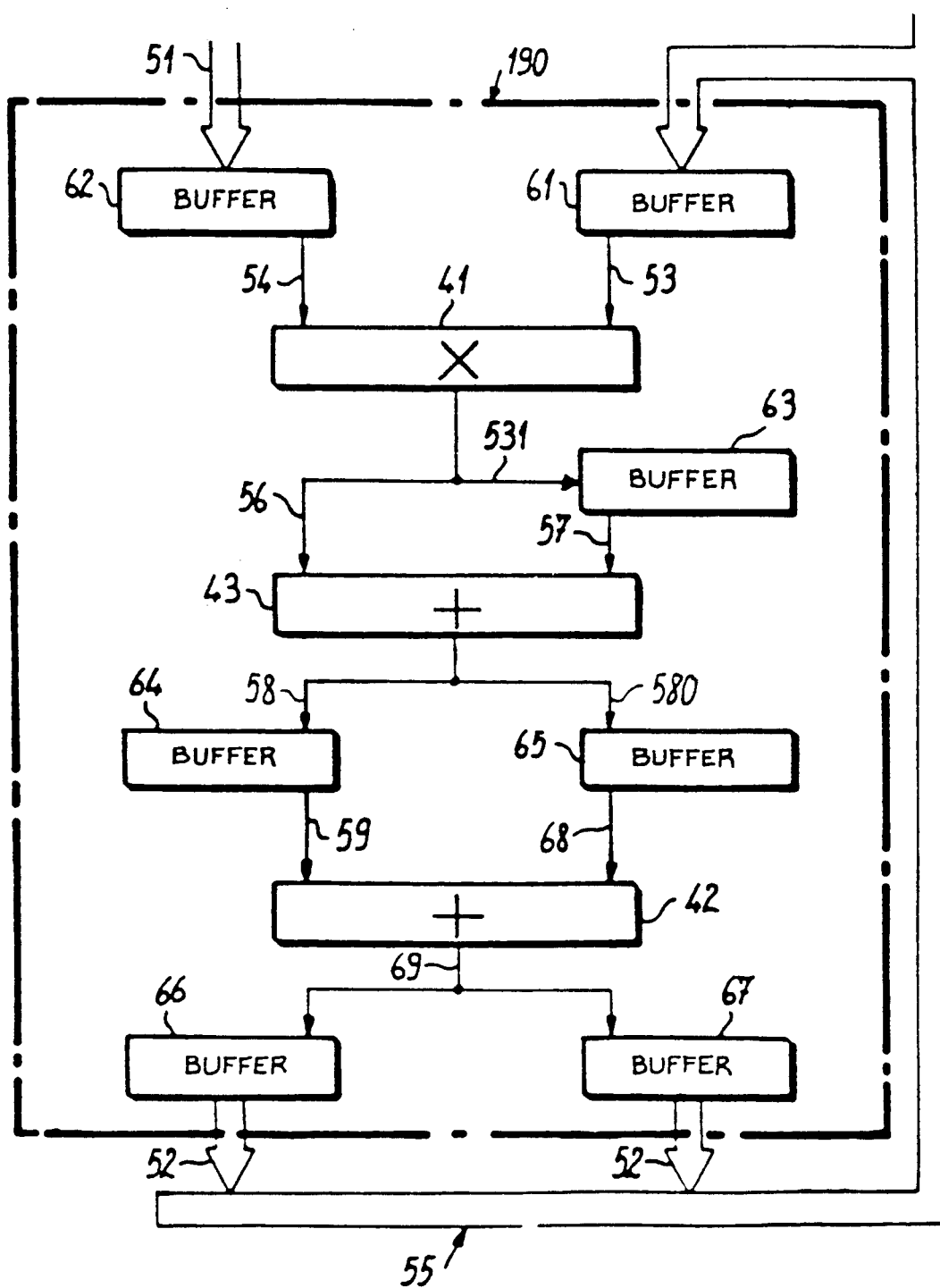
FIG_4

FIG_5
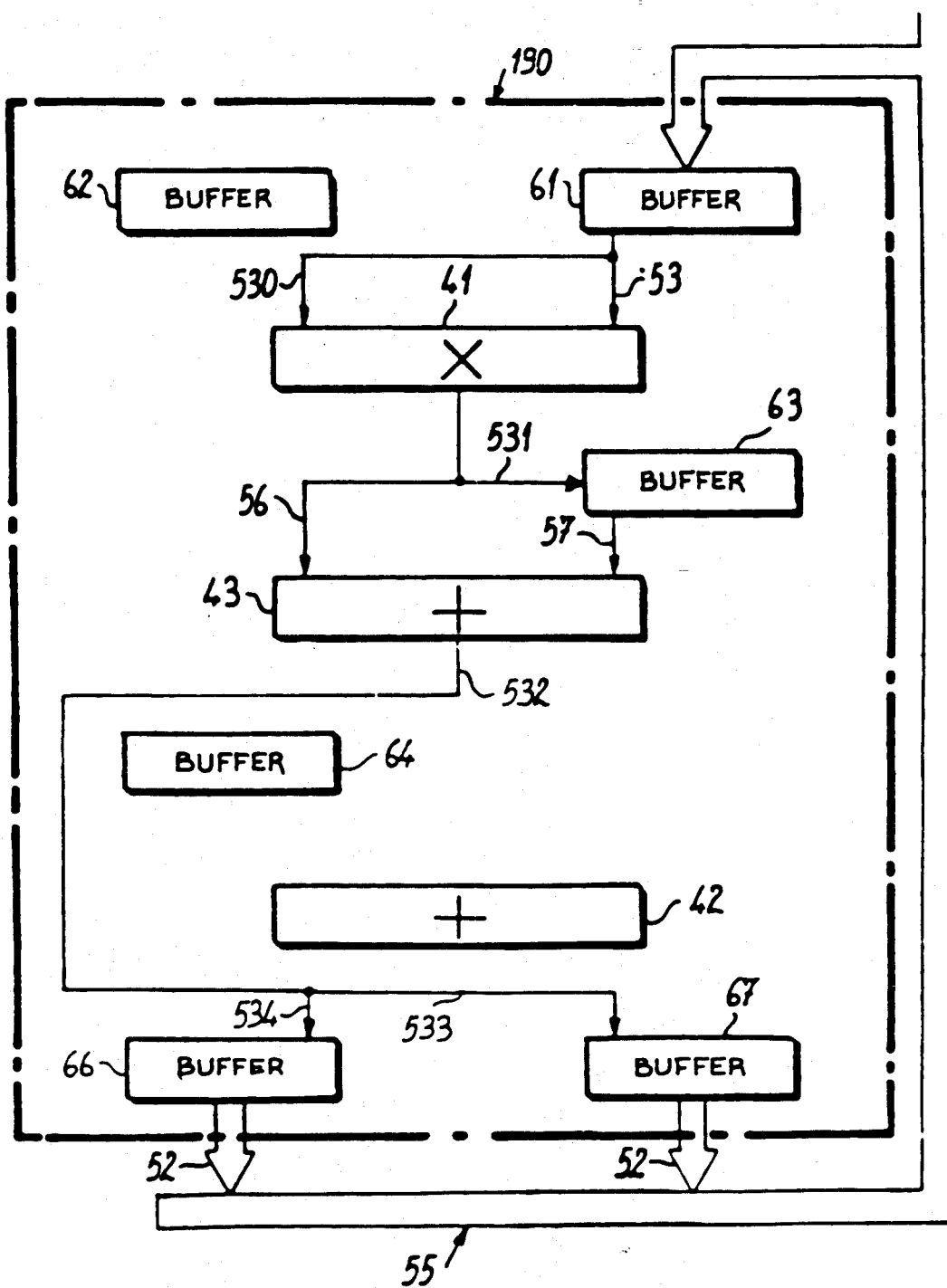

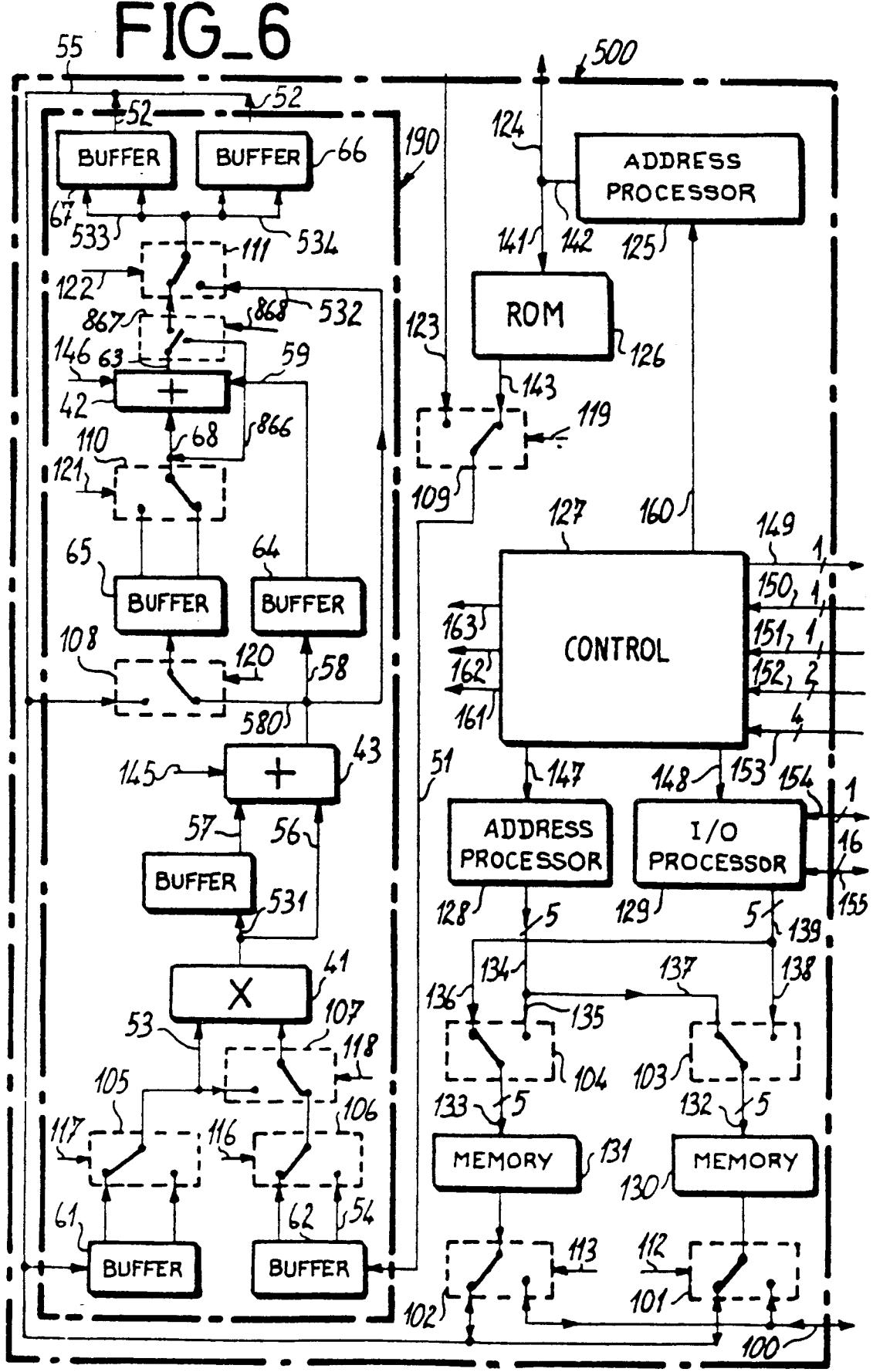
FIG_6

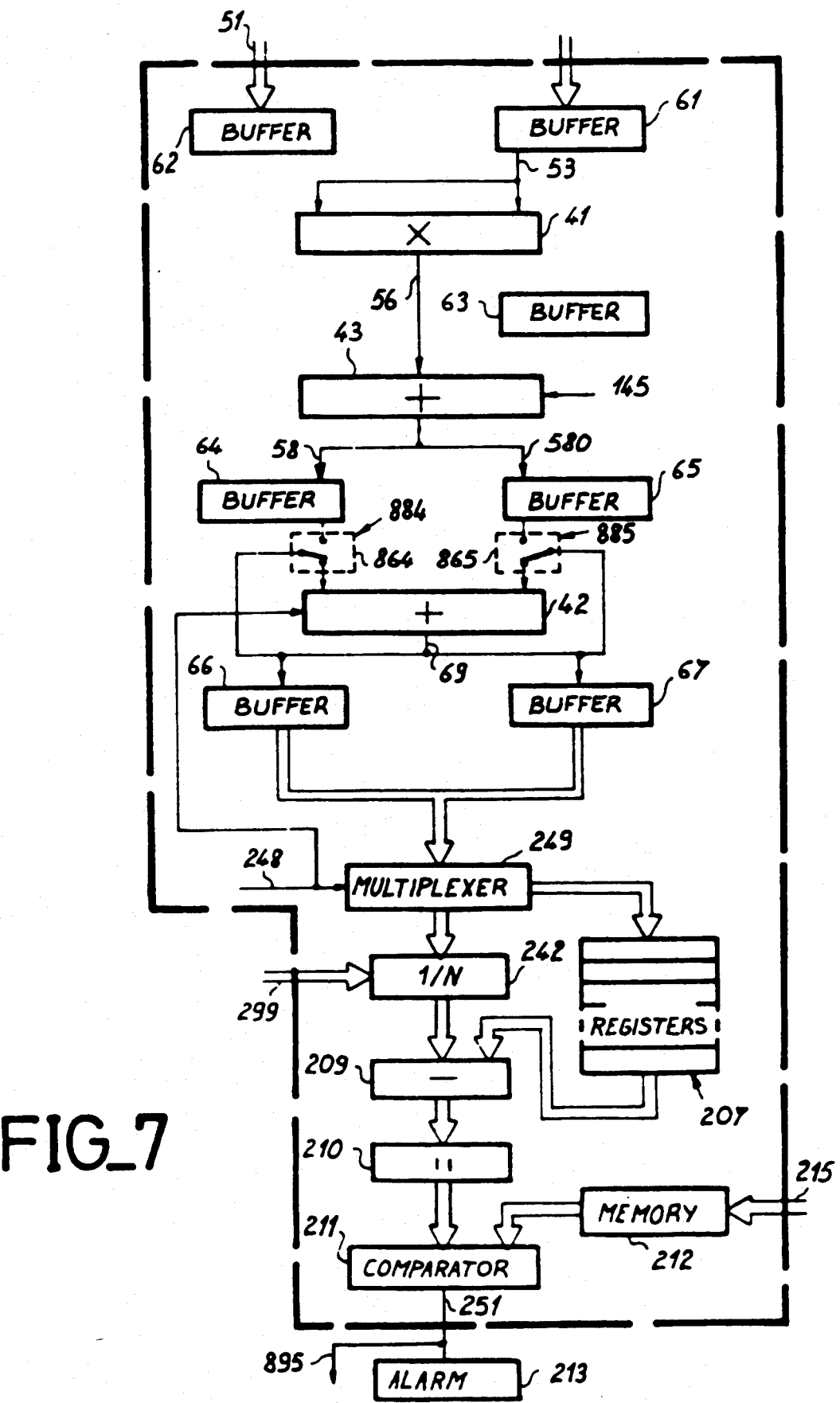
FIG_7

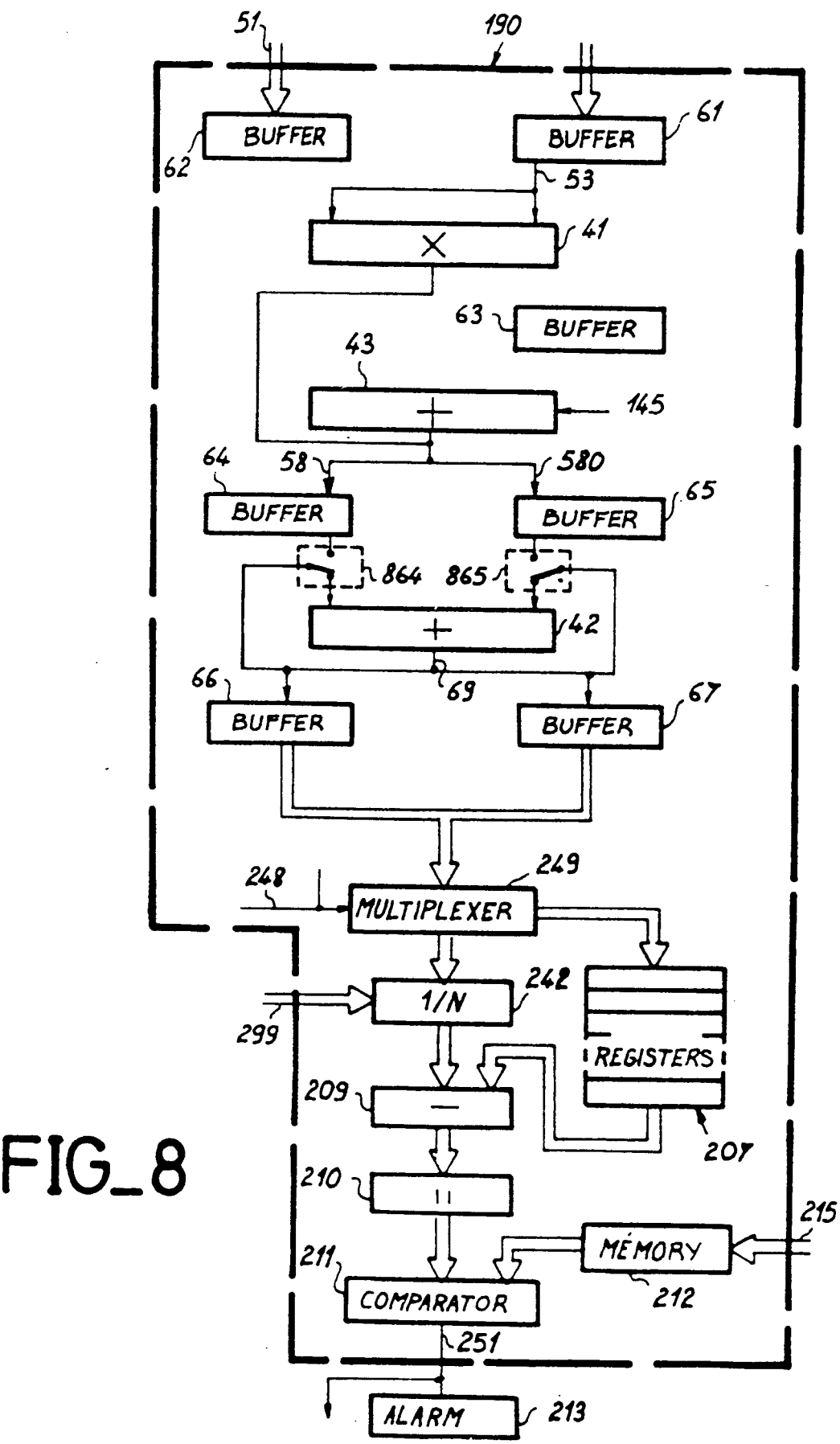
FIG_8

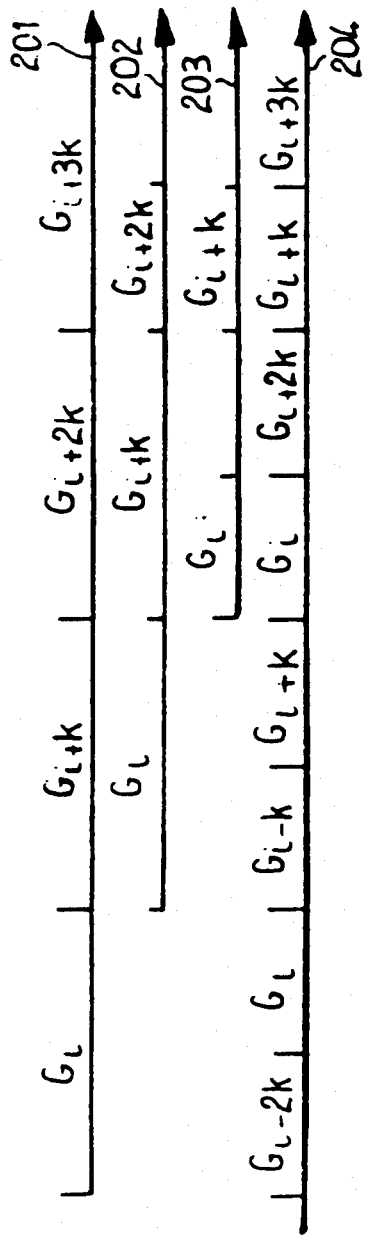
FIG_9
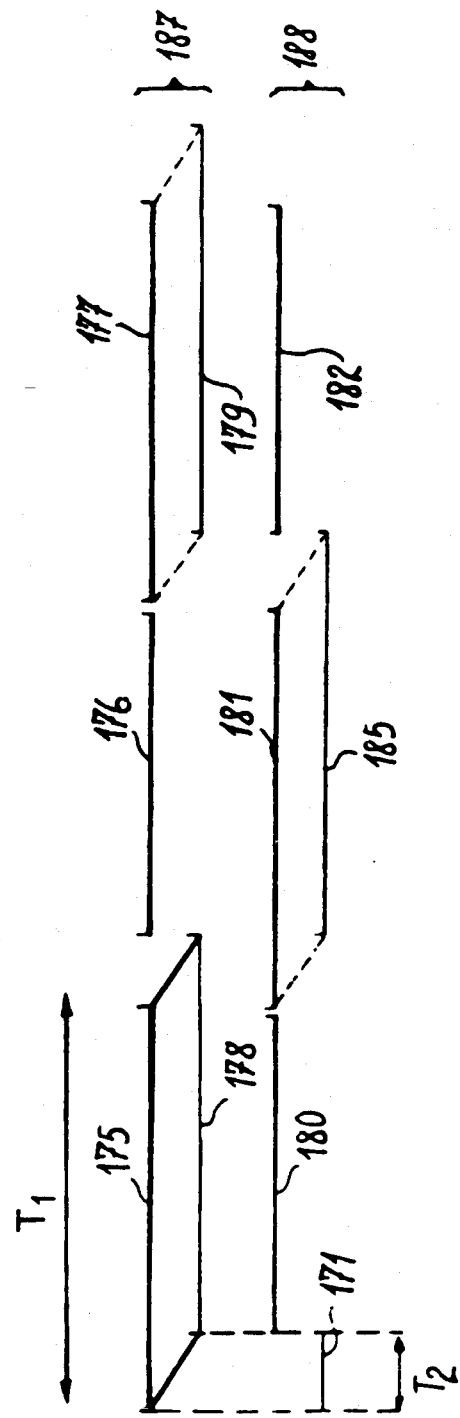
FIG_10

DISCRETE FOURIER TRANSFORM CALCULATING PROCESSOR COMPRISING A REAL-TIME TESTING DEVICE

This application is a continuation of application Ser. No. 045,881, filed on May 4, 1987, now abandoned.

BACKGROUND OF THE INVENTION

1. Field of the Invention

The main object of the invention is a processor to calculate the discrete Fourier transform, a processor comprising a real-time testing device.

The Fourier transform is an extremely powerful mathematical tool used especially to calculate spectra.

The Fourier transform can be used in particular to calculate convolution. For the Fourier transform of the convolution of two functions is equal to the Fourier transform product of these two functions. Thus, at each point, the convolution of two functions is equal to the reverse Fourier transform of the product of the Fourier transforms of these two functions.

It is often advantageous to weight a function for which it is desired to calculate the Fourier transform. The device, which is the object of the present invention, can be used to perform the weighting operation, upon command, for example before the calculation of the Fourier transform. For a discrete sequence, the weighting is done by multiplying the terms of the sequence by the weighting coefficients which are stored, for example, in a read-only memory. Advantageously, the read-only memory contains several sets of coefficients so that the desired weighting can be chosen.

It is often indispensable to verify the validity of the results calculated. This is especially important when a calculating device is used in a hostile environment. One solution lies, for example, in doubling the number of calculating circuits and in associating them with a comparator which validates the calculator only if the results calculated by both circuits are identical. This method proves to be very costly. The device according to the invention can be used to verify the results of the calculation of the Fourier transform for a pre-determined rate of error. For this, the device verifies the result of the calculation of the Fourier transform by means of Parseval's theorem. During a test, the circuit of the invention performs the calculation of Parseval. The result calculated by the operator is validated solely in case of equality of the two sides of Parseval's equation. The same processor can be used to calculate the Fourier transform and verify so that the complexity of the processor is not substantially increased.

SUMMARY OF THE INVENTION

The circuit, which is the object of the present invention, comprises a circuit that performs a numerical calculation for a sequence of numbers, a calculation known as the discrete Fourier transform, which shall be called DFT in the rest of this patent. For each period of time, the values of the DFT are substantially equal to the value of the Fourier transform.

Let f be a sequence of numbers $f_n$, n being the index of the number $f_n$ in the sequence f.

The sequence f is, for example, the sequence of N numerical values of a function that has been sampled.

$F_k$, DFT of $f_n$ is defined by:

$$F_k = \sum_{n=0}^{N-1} f_n W^{nk}$$

with $W = e^{-j(2\pi/N)}$.

The device according to the invention proposes to break down a complex calculation into successive simple calculations. For this, the device according to the invention uses a butterfly type structure depicted in the FIG. 1.

The DFT-calculating algorithm is that of splitting up the operations in time: if N is an even number, the sequence f can be broken down into a sequence g of terms of f with an even coefficient and a sequence h of terms of the sequence f with an odd coefficient. For $0 < L <^* N/2 - 1$, $$g_L = f_{2L}$$

$$h_L = f_{2L+1}$$

Let $G_k$ and $H_k$ be the DFT of $g_L$ and $h_L$ respectively.

$$G_k = \sum_{L=0}^{L=\frac{N}{2}-1} g_L (W^2)^{Lk}$$

$$H_k = \sum_{L=0}^{L=\frac{N}{2}-1} h_L (W^2)^{Lk}$$

Then $$F_k = \begin{cases} G_k + W^k H_k & \text{for } 0 \leq k \leq \frac{N}{2} - 1 \\ G_{k-N/2} + W^k H_{k-N/2} & \text{for } \frac{N}{2} \leq k \leq N - 1 \end{cases} \quad (1)$$

Especially for two indices, the difference of which is equal to N/2, we get:

$$W^{m+N/2} = -W^m$$
$$F_m = G_m + W^m H_m \text{ and}$$
$$F_{m+\frac{N}{2}} = G_m + W^{m+\frac{N}{2}} H_m = G_m - W^m H_m$$

BRIEF DESCRIPTION OF THE DRAWINGS

The invention will be better understood from the following description and the appended figures, given by way of non-exhaustive examples. Of these figures:

FIG. 1 depicts a calculating cycle, known as the DFT butterfly, for real numbers;

FIG. 2 depicts a DFT butterfly for complex numbers;

FIGS. 3 to 5 depict the data paths.

FIG. 6 depicts a mode of embodiment of a circuit used in the invention;

FIG. 7 depicts a mode of embodiment of a circuit according to the invention;

FIG. 8 depicts a mode of embodiment of the circuit according to the invention;

FIGS. 9 and 10 depict the changes, in time, of the functions of the components of the circuit according to the invention.

FIGS. 1 to 10 use the same references to designate the same elements.

FIGS. 1 to 10 indicate the direction of the flow of data by arrows.

FIG. 1 shows a block diagram of a DFT butterfly 50, using the algorithm of the splitting up the operations in time. The butterfly 50 comprises a first line 1, with an input 11 and an output 12, and a second line 2, with an input 21 and an output 22. The line 1 comprises an adder 42. The line 2 comprises a multiplier 41 followed by an adder 43. The inputs of the multiplier 41 are connected to the input 21 of the line 2 and to the line 3. The inputs of the adder 42 are connected firstly to the line 1, and secondly to the line 2 at the level of the output of the multiplier 41 by means of a line 23. The inputs of the adder 43 are connected firstly to the line 2 at the level of the output of the multiplier 41 and secondly to the line 1, upstream of the adder 42, by a line 13.

The butterfly 50, depicted in FIG. 1, is especially well suited to calculating the terms of DFT of real number sequences with the calculation split up in time. Splitting up the calculation in time assumes that the terms of the sequences g and h are presented at the inputs 11 and 21 of the butterfly 50. By contrast, the ordinate terms of the sequence F are found at the outputs 12 and 22 of the butterfly 50. The following table gives the correspondence of the input and the output indices for an 8-term DFT. The correspondence of the indices is linked by the so-called "reverse bit" relation for the heavy low and the low figures are permutated in the binary writing of the indices.

TABLE 1

| Input index | | Output index | |
|---|---|---|---|
| Decimal | Binary | Decimal | Binary |
| 0 | 000 | 000 | 0 |
| 4 | 100 | 001 | 1 |
| 2 | 010 | 010 | 2 |
| 6 | 110 | 011 | 3 |
| 1 | 001 | 100 | 4 |
| 5 | 101 | 101 | 5 |
| 3 | 011 | 110 | 6 |
| 7 | 111 | 111 | 7 |

FIG. 2 depicts a set of two butterflies 50 capable of performing the DFT calculation on sequences of complex numbers. Each of the butterflies 50 has an adder 44, one input of which is connected to the output of the multipliers 41. The other input of the said adders 44 is connected through multipliers 45 to the inputs 21 of complementary butterflies. Furthermore, the inputs of the multipliers 45 are connected to a line 32. The inputs of the multipliers 41 are connected to a line 31. The lines 31 and 32 correspond to the line 3 of the FIG. 1.

FIG. 3 depicts the data path for the DFT calculation in an example of a processor according to the invention. The device 190 of FIGS. 3, 4 and 5 comprises the multiplier 41, the adders 42 and 43 as well as buffer memories 61 to 67. The buffer memories 61 to 67 cause a delay in a clock cycle, necessary for the synchronism of the pipeline structure of the processor according to the invention as well as for a re-synchronization with the clock pulses. A data bus 55 links the device 190 of FIGS. 3, 4 and 5 to a memory which is not depicted. The input of the buffer memory 61 is linked to the bus 55. The input of the buffer memory 62 is linked by a bus 51 to a DFT coefficient memory which is not depicted. The outputs of the buffer memories 61 and 62 are linked to the inputs of the multiplier 41 by the lines 53 and 54 respectively. The output of the multiplier 41 is linked firstly, by a line 531 to the buffer memory 63 and secondly, by a line 56 to an input of the adder 43. The output of the buffer memory 63 is linked to the other output of the adder 43 by a line 57. The output of the adder 43 is linked to the input of the buffer memory 64 by a line 58. The output of the buffer memory 64 is linked to an input of the adder 42 by a line 59. The input of the buffer memory 65 is linked to the bus 55. The output of the buffer memory 65 is linked to the other input of the adder 42 by a line 68. The output of the adder 42 is linked to the inputs of the buffer memories 66 and 67 by a line 69. The outputs 52 of the buffer memories 66 and 67 are linked to the bus 55.

FIG. 4 shows the data paths for the calculation of the weighting in an example of the processor according to the invention. The input of the buffer memory 61 is linked to the bus 55. The input of the buffer memory 62 is linked by a bus 51 to a DFT coefficients memory which is not depicted. The outputs of the buffer memories 61 and 62 are linked to the inputs of the multiplier 41 by the line 53 and 54 respectively. The output of the multiplier 41 is linked firstly, by the line 531 to a buffer memory 63 and secondly, by the line 56 to an input of the adder 43. The output of the buffer memory 63 is linked to the other input of the adder 43 by the line 57. The output of the adder 43 is linked firstly to the input of the buffer memory 65 by the line 580 and secondly, to the input of the buffer memory 64 by a line 58. The output of the buffer memory 65 is linked to an input of the adder 42 by a line 68. The output of the buffer memory 64 is linked to the other input of the adder 42 by a line 59. The output of the adder 42 is linked to the inputs of the buffer memories 66 and 67 by the line 69. The outputs 52 of the buffer memories 66 and 67 are linked to the bus 55.

FIG. 5 shows the data path for the calculation of the module of an example of a processor 190 according to the invention. The buffer memories 62 and 64 as well as the adder 42 of the device 190 are not connected for the calculation of the module. The input of the buffer memory 61 is linked to the bus 55. The output of the buffer memory 61 is linked to a first input of the multiplier 41 by a line 53 and to a second input of the multiplier 41 by a line 530. The output of the multiplier 41 is linked firstly, to the input of the buffer memory 63 by a line 531 and secondly, to an input of the adder 43 by the line 56. The output of the buffer memory 63 is linked to the other input of the adder 43 by the line 57. The output of the adder 43 is linked to inputs of the buffer memories 66 and 67 by the lines 534 and 533 respectively. The outputs 52 of the buffer memories 66 and 67 are linked to the bus 55.

The device according to the invention described below verifies the proper functioning of the circuit to calculate DFT, by using the theorem of Parseval which is simpler than the DFT calculating algorithm. Furthermore, the dependability of the entire system is heightened by the fact that the verifying calculations are independent from the calculations to be verified.

The theorem of Parseval indicates that the power of the signal analyzed is equal to the sum of the powers of its harmonic values. For the DFT, the theorem of Parseval is expressed by the formula:

$$\sum_{n=0}^{N-1} |x(n)|^2 = \frac{1}{N} \sum_{k=0}^{N-1} |X(k)|^2 \qquad (I)$$

In the above formula, x(n) is the nth element of the input sequence of the DFT processor and X(k) is the kth element calculated by the DFT processor.

To calculate a DFT with N points by means of the operator 500 of FIG. 6, it is necessary to go through $N/2 \log_2 N$ FFT butterflies of FIG. 1, corresponding to $2N\log_2 N$ multiplications and to $3N\log_2 N$ additions. By contrast, a calculation to verify the result using the theorem of Parseval requires 2N multiplications and $2(N-1)$ additions. Thus the calculation of the DFT requires $\log_2 N$ times the number of multiplications and $3N\log_2 N$ times the number of additions of the verification of this calculation.

In one mode of embodiment, the operator 500 of FIG. 6 performs DFTs on N points, with N varying between 8 and 8,000. Thus, in the least favorable case, the DFT verifying device performs three times fewer multiplications and 5.4 times fewer additions. By use of an adder 42 and a multiplier 41 in common to calculate the DFT and the verification, it is possible to reduce the complexity of the circuit as well as its area.

FIG. 6 depicts an especially efficient mode of embodiment of the DFT-calculating processor 500 according to the invention. The processor 500 can be used to choose the DFT calculation, the weighting calculation followed by the DFT calculation or the calculation of the modules or the calculation of the sides of Parseval's equation:

$$\sum_{n=0}^{N-1} |x(n)|^2 = \frac{1}{N} \sum_{k=0}^{N-1} |X(k)|^2 \qquad (I)$$

In the non-exhaustive mode of embodiment of FIG. 6, the means used to compare the two sides of the equation I are external to the processor 500 and are not illustrated. On the basis of the information contained in the patent, the method for making a processor that performs first the correlations and then the DFT followed by a weighting calculation will be obvious to the specialist. The processor 500 comprises the device 190 of FIGS. 3, 4 and 5, two random-access memories 130 and 131, one inputs/outputs processor 129, one processor 128 to calculate the addresses of memories 130 and 131, a coefficients memory 126 associated with an address processor 125 as well as a logic circuit 127 for the monitoring of the processor 500. The presence of the internal memories of the processor 500 as well as their address processor and inputs/outputs processor can be used to increase the processing speed of the processor. The data paths desired in the processor 500 are chosen by means of switches 101, 102, 103, 104, 105, 106, 107, 108, 109, 110, 111 and 867, controlled by the signals 112, 113, 114, 115, 116, 117, 118, 119, 120, 121, 122 and 868 respectively. The switch-controlling signals are transmitted by the monitoring unit 127 through the line 161.

The device 190, the switches 105 and 106 can be used to choose the outputs of the buffer memories 61 and 62. The output of the switch 106 is connected to the switch 107 by which it is possible to choose one of the inputs of the multiplier 41 between the output of the memory 62 and that of the memory 61. The switch 108 can be used to choose either the connection of the input of the buffer memory 65 to the bus 55 or the connection of this input to the output of the adder 43. The switch 110 can be used to choose one of the two outputs of the buffer memory 65. The switch 867 connects the output of the adder 42 to one of its inputs by means of a line 866. Thus the adder 42 is capable of calculating the sums needed to check the proper functioning of the circuit by the theorem of Parseval. In one alternative mode of embodiment of the device according to the invention, the adder 42 is an accumulating adder. The switch 111 can be used to make a choice for sending the data present at the output of the adder 42 to the buffer memory 66 or 67.

In the example embodiment of FIG. 6, the memories 130 and 131 are small sized. Thus, a data bus 100 links them to an external memory which is not depicted. The sequence for which it is sought to calculate the DFT is stored in this latter memory. The switches 101 and 102 can be used to choose either the writing of the data from the bus 100 or the reading of the data in memory, and the sending of the memories 130 and 131 respectively to the bus 55. The switch 101 receives a control signal 112, and the switch 102 receives a control signal 113. The memories 130 and 131 comprise an address bus 132 and 133 respectively. In the mode of embodiment depicted in FIG. 6, the Applicant has used 5-bit address buses corresponding to the capacity of the memories 130 and 131. The address buses 132 and 3133 are linked to the inputs/outputs 129 processor in writing mode or to the address processor 128 in reading mode. The selection is done by the memories 130 and 131 respectively, by means of the switch 103 and 104 which receive the control signals 114 and 115 respectively. The input/output processor 129 is linked to the switch, firstly, by a line 139 which is itself linked to the switch 103 by means of a line 138, and to the switch 104 by a line 136. The address processor 128 is linked to the switches 103 and 104 respectively by the lines 137 and 135 linked to the line 134. The inputs/outputs processor 129 is linked by the line 155 to the external memory (not depicted) to which it sends, for example, the address to be read, in 16 bits to the said external memory.

In the reading mode, the memories 130 and 131 are linked to the data bus 55 in order to provide the device 190 with the data to be processed.

The memory 126 contains the coefficients W of the DFT. It is connected to the bus 51 by means of the line 143 and the switch 109. The address processor 125 of the memory 126 is linked to its address bus 141 by a line 142. The memory 126 is, for example, a read-only memory or a programmable read-only memory. The device according to the invention can be advantageously used to change the coefficients W of the EFTs. The supplementary sets of coefficients are stored in an external memory of the processor 500. The address processor 125 can be used to address this memory by the line 142 and the bus 124. The data of this memory are present at the bus 123 which is connected to the bus 51 by means of the switch 109. The input/output processor 129 is connected to an external input/output clock. All the clocks internal to the processor 500 are synchronized by the monitoring device 127 by means of the line 162. Depending on the type of calculation to be made, the adders 43 and 42 must perform additions or subtractions. The switching-over between these two functions is performed by the signals 145 and 146 received from the monitoring device 127 through the line 163. The number N of the terms of the sequence f, for which it is sought to calculate the DFT, is given by the line 153. The command to perform a weighting operation is given to the monitoring device 127 by the line 152, on one bit for example. The command to calculate the module is given to the monitoring device 127 by the line 151, on one bit for example. The command to begin the calculation is given to the monitoring device 127 through the line 150, for example on a line that transmits one bit. The end of the calculations is reported by a monitoring device 127 through the line 149, on one bit for example. To avoid burdening the figure, the lines 161, 162 and 163 are not depicted.

The memory 126 comprises the coefficients w of the DFT which are, for example, the Nth roots of 1. In fact, for all the calculations, it is the coefficient belonging to the interval $0.\pi$ which is necessary. In one alternative embodiment, the memory 126 contains only the coefficients belonging to the interval $0.\pi/4$, the other coefficients being deducted by conventional trigonometrical rules. The memory 126 contains the maximum sized DFT coefficient that it is sought to calculate, for example 4,96. The coefficient of a DFT of a smaller size constitutes a subset of the maximum sized DFT coefficients.

In one mode of embodiment, the multiplier 41 is a multiplier working on fixed-format data, for example, with 16 bits comprising 8 stages.

In the second mode of embodiment, used to multiply numbers in a floating decimal point format, the multiplier has a circuit for processing the exponent giving the exponent of the result.

In the third mode of embodiment, the multiplier 41 has a device used to give respective weights to the bits in case the format is not standardized.

The adders 43 and 42 process floating decimal point format operands with 6 bits of exponent and 18 bits of mantissa. Advantageously, the adders comprise three pipe-line stages comprising a de-standardizing stage, an adder stage and a re standardizing stage.

As depicted by the formula 1, the calculation by the device of the invention of a DFT consists in subdividing it into independent small-sized groups by continuing to execute the butterfly-shaped DFTs of FIGS. 1 or 2. The number of these butterflies of one group is therefore set by the size of the input data table. For example, for a DFT with 32 terms, two stages are performed: a first stage with four groups of eight terms and a second stage with eight groups of four terms. Thus, a successive transfer is made, one by one, of the four eight-term data tables, then of the eight four-point data tables into the memories 130 and 131. Once the calculation is done, the resulting tables are transferred to the external memory (not depicted) to the same addresses as the input tables. It is then said that the calculation is performed on the spot. The internal memory of the calculation is divided into two blocks, 130 and 131, which alternately act as input/output memories and as the calculating memory. Advantageously, the bus 100 has a capacity providing for the access of complex data. For example, from the elementary operation necessitating four real multiplications and six real additions, the memory 130 for example, will give a device 130 with complex data and will also receive two complex data. The coefficients are derived, for example, from the memory 126. The following tables give the breakdowns which can be used to calculate the DFT ranging between eight terms to 32768 terms.

TABLE II

| N | Grouping | Number of stages |
|---|---|---|
| 8 | 8 | 1 |
| 16 | 16 | 1 |
| 32 | 32 | 1 |

TABLE II-continued

| N | Grouping | Number of stages |
|---|---|---|
| 64 | 8 × 8 | 2 |
| 128 | 8 × 16 | 2 |
| 256 | 16 × 16 | 2 |
| 512 | 16 × 32 | 2 |
| 1024 | 32 × 32 | 2 |
| 2048 | 8 × 16 × 16 | 3 |
| 4096 | 16 × 16 × 16 | 3 |
| 8192 | 16 × 16 × 32 | 3 |
| 16384 | 16 × 32 × 32 | 3 |
| 32768 | 32 × 32 × 32 | 3 |

The memory, for example 130, is therefore stored either with:
Four 8-term tables;
Or two 16-term tables;
Or one 32-term table.

In general, the external memory (not depicted) contains R tables of N terms. At the end of a DFT calculation of N terms, the processor 129 goes to the following table.

FIG. 9 depicts the address sequences needed for the various stages of DFT processing by the processor 500. We have seen in the table II that a DFT with N terms can be broken down, for example, into three stages comprising groups of N1, N2, N3 terms such that $N = N_1 \times N_2 \times N_3$. In one mode of embodiment, one address sequence $G_I$ comprised the juxtaposition of three numbers C1, C2 and C3 with lengths of $Log_2N_1$, $Log_2N_2$, $Llog_2N_3$, respectively. The processor 129 gives the external memory the address of the input data of the group to be calculated. For calculations of the group with a size $N_1$, C1 is made to vary while C2 and C3 remain constant. To calculate the group with a size $N_2$, C2 is made to vary while C1 and C3 remain constant. To calculate the group with a size $N_3$, C3 is made to vary while C1 and C2 remain constant An example of an address given by a processor 129 to the external memory with a size $N_1$ is given by the table III.

TABLE III

| $C_1$ | | | $C_2$ | | | $C_3$ | | |
|---|---|---|---|---|---|---|---|---|
| $2^8$ | $2^7$ | $2^6$ | $2^5$ | $2^4$ | $2^3$ | $2^2$ | $2^1$ | $2^0$ |
| 256 | 128 | 64 | 32 | 16 | 8 | 4 | 2 | 1 |
| 0 | 0 | 0 | 0 | 1 | 1 | 0 | 1 | 0 |
| 0 | 0 | 1 | 0 | 1 | 1 | 0 | 1 | 0 |
| 0 | 1 | 0 | 0 | 1 | 1 | 0 | 1 | 0 |
| 0 | 1 | 1 | 0 | 1 | 1 | 0 | 1 | 0 |
| 1 | 0 | 0 | 0 | 1 | 1 | 0 | 1 | 0 |
| 1 | 0 | 1 | 0 | 1 | 1 | 0 | 1 | 0 |
| 1 | 1 | 0 | 0 | 1 | 1 | 0 | 1 | 0 |
| 1 | 1 | 1 | 0 | 1 | 1 | 0 | 1 | 0 |

Since the calculation takes place on the spot, the processor 129 gives the output addresses. These addresses, however, are staggered in time with respect to the input addresses.

TABLE IV

| Inputs/Outputs | | Internal memory | | | | | | |
|---|---|---|---|---|---|---|---|---|
| Stage input sequence | Implantation | 1st stage sequence | | 2nd stage sequence | | 3rd stage sequence | |
| 0 | 0 | 0 | 000 | 0 | 000 | 0 | 000 |
| 1024 | 1 | 1 | 001 | 2 | 010 | 4 | 100 |
| 512 | 2 | 2 | 010 | 4 | 100 | 1 | 001 |
| 1536 | 3 | 3 | 011 | 6 | 110 | 5 | 101 |
| 256 | 4 | 4 | 100 | 1 | 001 | 2 | 010 |
| 1280 | 5 | 5 | 101 | 3 | 011 | 6 | 110 |
| 768 | 6 | 6 | 110 | 5 | 101 | 3 | 011 |

TABLE IV-continued

| Inputs/Outputs | | Internal memory | | | | | |
|---|---|---|---|---|---|---|---|
| Stage input sequence | Implantation | 1st stage sequence | | 2nd stage sequence | | 3rd stage sequence | |
| 1792 | 7 | 7 | 111 | 7 | 111 | 7 | 111 |

In the mode of embodiment depicted in FIG. 6, the weighting coefficients are contained in a memory external to the processor 500. The address processor 125 calculates these coefficients and transmits them by the line 142 to the bus 124. The coefficients obtained are sent in the non-depicted external memory through the data bus 123 to the bus 51. Since each term, for which it is sought to calculate the DFT, has to be multiplied by a coefficient of the same index, in one mode of embodiment the coefficients are calculated by a binary counter. The coefficients are present at the bus 123 sequentially In another mode of embodiment, the weighting coefficients are symmetrical with the terms of the index N/2. In this case, it is possible that the memory 126 thus does not contain N/2, the first coefficient of the law of weighting. In this case, a device transforming the address bits from the coefficient of the index N/2 is added to the address bus 141 of the memory 126.

In the following part of the description, we shall present an example of an addressing organization by the processor 125 of the memory 126, it being understood that other types of addressing organization would not be beyond the scope of the present invention. For example, the memory 126 may contain, arranged sequentially, one after the other, all the sequences of coefficients needed to perform the desired Fourier transform calculations. In this case, the address processor 125 would comprise a binary counter which would add one bit, at each clock cycle, to the address of the start of the sequence Advantageously, it is sought to limit the size of the memory 126 by storing the sequences of the coefficients needed to calculate the DFT only once by addressing them as many times as it is needed to perform a calculation. In this case, the address comprises two parts, a first part hereafter called a basic sequence, which depends solely on the size of the DFT group calculated, and a second part which shall hereafter be called the index, comprising the physical address within the memory 126 of the coefficient. An example of the addressing of a basic sequence is given by the tables V, VI and VII. Table V corresponds to a table for the calculation of eight terms, table VI to a table for the calculation of 16 terms and table VII to a table for the calculation of 32 terms. In one mode of embodiment, the index is obtained by making a binary mask correspond to each stage and by multiplying, bit by bit for bits of the same weight, the value of the mask for the value of the binary counter. An example of a basic sequence of this type for a size of $N_I = 16$ of the DFT table is given by the table VIII.

TABLE V $N_I = 8$

| Stage Butterfly | 0 | 1 | 2 |
|---|---|---|---|
| 0 | 0 | 0 | 0 |
| 1 | 0 | 0 | N/8 |
| 2 | 0 | N/4 | 2N/8 |
| 3 | 0 | N/4 | 3N/8 |

TABLE VI $N_I = 16$

| Stage Butterfly | 0 | 1 | 2 | 3 |
|---|---|---|---|---|
| 0 | 0 | 0 | 0 | 0 |
| 1 | 0 | 0 | 0 | N/16 |
| 2 | 0 | 0 | N/8 | 2N/16 |
| 3 | 0 | 0 | N/8 | 3N/16 |
| 4 | 0 | N/4 | 2N/8 | 4N/16 |
| 5 | 0 | N/4 | 2N/8 | 5N/16 |
| 6 | 0 | N/4 | 3N/8 | 6N/16 |
| 7 | 0 | N/4 | 2N/8 | 7N/16 |

TABLE VII $N_I = 32$

| Stage Butterfly | 0 | 1 | 2 | 3 | 4 |
|---|---|---|---|---|---|
| 0 | 0 | 0 | 0 | 0 | 0 |
| 1 | 0 | 0 | 0 | 0 | N/32 |
| 2 | 0 | 0 | 0 | N/16 | 2N/32 |
| 3 | 0 | 0 | 0 | N/16 | 3N/32 |
| 4 | 0 | 0 | N/8 | 2N/16 | 4N/32 |
| 5 | 0 | 0 | N/8 | 2N/16 | 5N/32 |
| 6 | 0 | 0 | N/8 | 3N/16 | 6N/32 |
| 7 | 0 | 0 | N/8 | 3N/16 | 7N/32 |
| 8 | 0 | N/4 | 2N/8 | 4N/16 | 8N/32 |
| 9 | 0 | N/4 | 2N/8 | 4N/16 | 9N/32 |
| 10 | 0 | N/4 | 2N/8 | 5N/16 | 10N/32 |
| 11 | 0 | N/4 | 2N/8 | 5N/16 | 11N/32 |
| 12 | 0 | N/4 | 3N/8 | 6N/16 | 12N/32 |
| 13 | 0 | N/4 | 3N/8 | 6N/16 | 13N/32 |
| 14 | 0 | N/4 | 3N/8 | 7N/16 | 14N/32 |
| 15 | 0 | N/4 | 3N/8 | 7N/16 | 15N/32 |

TABLE VIII $N_I = 16$

| | MASK | | | |
|---|---|---|---|---|
| STAGE COUNTER | 0 <br> 000 | 1 <br> 100 | 2 <br> 110 | 3 <br> 111 |
| 000 | 000 | 000 | 000 | 000 |
| 001 | 000 | 000 | 000 | 001 |
| 010 | 000 | 000 | 010 | 010 |
| 011 | 000 | 000 | 010 | 011 |
| 100 | 000 | 100 | 100 | 100 |
| 101 | 000 | 100 | 100 | 101 |
| 110 | 000 | 100 | 110 | 110 |
| 111 | 000 | 100 | 110 | 111 |

If the memory 126 contains only the coefficients of the interval 0.n/4, a decoder, not depicted in FIG. 6, is inserted before the memory 126. This decoder addresses the memory 1 to 6 as well as the device 190 making it possible to change the sign in accordance with the trigonometrical formulae which can be used to change from the interval $(0, \pi/4)$ to the interval $(0, \pi.)$ FIG. 7 shows the data paths for the calculation of the members of Parseval's equation.

One of the buffer memories, for example, 61, is linked by the line 53 to the inputs of the multiplier 41. The output of the multiplier 41 is linked to an adder, for example, the adder 42. In the mode of embodiment illustrated in FIG. 7, the output of the multiplier 41 is linked to the inputs of the adder 42 by means of a line 56, the adder 43, lines 58 and 580, buffer memories 64 and 65 and switches 864 and 865.

In this embodiment of the device according to the invention, the adder 43 can be rendered invisible in its operation, upon a command 145 received from the control circuit 1 to 7.

The switches 864 are used to connect either the output of the adder 42 or a buffer memory 64 to the first input of the adder 42.

The switch 865 can be used to link either the output of the adder 42 or the buffer memory 65 to a second input of the adder 42.

The switches 864 and 865 are monitored by control signals bearing the references 884 and 885 respectively.

In one mode of embodiment which is not depicted, the adder 42 is an accumulating adder. In this case, the switches 864 and 865 are no longer necessary.

The adder 42 is connected to a multiplexer 249, for example, by means of the buffer memories 66 and 67. The multiplexer 249 transmits the value of the adder 42 alternately to the divider 242 or the register 207.

The divider 242 divides the value received by N. The value N, which is equal to the number of points on which the DFT calculation is done, is transmitted to the divider 242 by the bus 299. The registers 207 delay the signal by a predetermined number of time periods. For example, if the calculation of the checks done by the operator 214 is three times faster than the calculation of the DFT by the operator 500 of FIG. 6, the registers 207 have three series-connected registers, thus introducing a delay of three clock cycles.

The output of the registers 207 and the divider 242 is connected to two inputs of the subtracter 209. The subtracter 209 calculates the difference between the two members of the equation (I) of the theorem of Parseval. The subtracter 209 is connected to the operator 210 which calculates the absolute value of the difference calculated by the subtracter 209.

The operator 210, on the one hand, and the memory 212 on the other hand, are connected to the comparator 211. The memory 212 contains the maximum error value permissible in the calculation of the DFT.

Advantageously, the memory 212 is a random-access memory. The value stored in the memory 212 is charged, for example, by a bus 215. If the difference between the two members of the equation of Parseval (I) is greater than the tolerance value stored in the memory 211, the comparator 211 sets off an alarm device 213 by means of a line 251.

It is clearly understood that the processors of FIGS. 7 and 8 are indicated as non-exhaustive examples. For example, the processor 210 may be absent in a parallel link if the sign is not kept. Similarly, the divider 242 performing a division by a power of 2 may be replaced by an adequate cabling of the operator 190.

If a test shows up a failure in a processor according to the invention, several measures may be taken to minimize the consequences of this failure such as, for example:

The disconnection and, possibly, the replacement of the defective processor;

The re-configuration of a multiprocessor system, with the processors for which the test has not revealed any failure taking charge of the calculations which should have been performed by the faulty processor.

The reconfiguration of the system is obtained, for example, by a control signal 895 transmitted from the line 251 onwards.

FIG. 9 shows the variation in the address sequence times. The curve 201 depicts the variations in time of the address sequences Gi for transfer between the external and the internal memory. The curve 202 depicts the development in time of the address sequences of the group for which the processings are done. The curve 203 depicts the development in time of address sequences $G_i$ of the internal memory/external memory transfers. The curve 204 depicts the address sequences which must be calculated by the processor 129 of the FIG. 6. Hence, in the example where the starting point is $G_i$ and where K=1, the sequence $G_i$, $G_i+2$, $G_i+1$, $G_i+3$, $G_i+2$, $G_i+4$, etc. ... k, this is equal to the number of terms of the partial sequence by the number of terms of the group of the stage in progress. An example of implantations for a calculation of an 8-term group successively comprising three stages of four butterflies of FIG. 1 is given by the table 4. The rest of the first step is sequential: at the start of each of the following steps a circular shift is made to the left of $Log_2$ (the size of the group).

FIG. 10 shows the development in time of the functions performed by the memories 130 and 131. The functions performed by the memory 130 bear the reference 87. They are performed by the memory 131 with the reference 188. The length T1 corresponds to the computing time and the length T2 corresponds to the pipe-line delay of the computer. A first reading function of a memory 130 bears the reference 175 in the figure while the writing function bears the reference 178. Simultaneously, the memory 131 terminates the writing at 171 and begins the management of the inputs/outputs at 180. At the following cycle, the memory 130 provides for the exchanges with the external memory at 176, i.e. the inputs and outputs. Simultaneously, the memory 131 provides for the reading at 181 and for the writing at 185. At the following cycle, the roles are re-exchanged: at 177 the memory 130 provides for the reading and at 179 it provides for the writing while the memory 131 fulfills the inputs/outputs role at 182. Since the rest of the cycles continue in a similar way, they are not depicted in the figure.

In a first mode of embodiment, the device of the invention is made in the form of printed circuits. Advantageously, the device according to the invention comprises integrated circuits. Advantageously, these integrated circuits use gallium arsenide technology providing for very fast processing.

In a second embodiment of the device according to the invention, the device is made in the form of an integrated circuit. Advantageously, this integrated circuit is made using gallium arsenide technology.

What is claimed is:

1. A device for calculating a discrete Fourier transform and for conducting a comparison according to Parseval's equation comprising:

input buffer memory means for receiving input data;

multiplication means connected to said buffer memory means;

addition means and second buffer memory means interconnected with said multiplication means for performing the operations necessary to calculate the various terms of said discrete Fourier transform;

output buffer memory means for transmitting said calculated terms;

memory means for storing and delivering said input data and said calculated terms; and controlling means for controlling the operation of said input buffer memory means, said multiplication means, said addition means and said second buffer memory means, said output buffer memory means, and said memory means;

first switching means connected between said input buffer memory means and said multiplication means and controlled by said controlling means for allowing said multiplication means to square said input data during a testing operation according to Parseval's equation;

second switching means connected to an output of said addition means and alternatively for connecting an input of said addition means to said output of said addition means to form an accumulator and connecting to said second buffer memory means;

subtracter means for subtracting a left side from a right side of Parseval's equation as calculated by said multiplication means and addition means when they are connected by said first and second switching means for the testing operation; and comparison means for comparing an absolute value of the difference between the right side and the left side of Parseval's equation provided by said subtracting means and a tolerance value.

2. A device according to claim 1 wherein said addition means comprises an accumulating adder connected to said multiplication means.

* * * * *